No. 808,657. PATENTED JAN. 2, 1906.
D. HEGGIE.
SOCKET WELDING APPARATUS.
APPLICATION FILED MAR. 23, 1903.
2 SHEETS—SHEET 1.
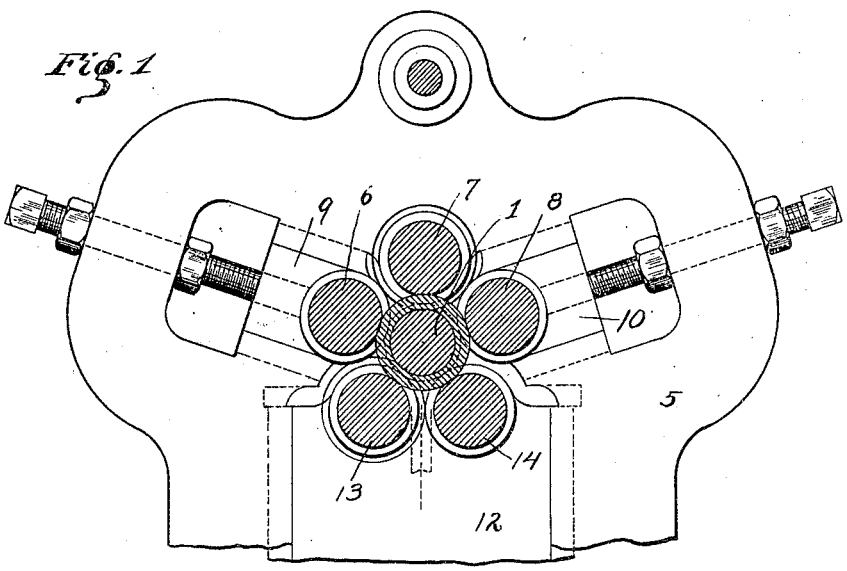
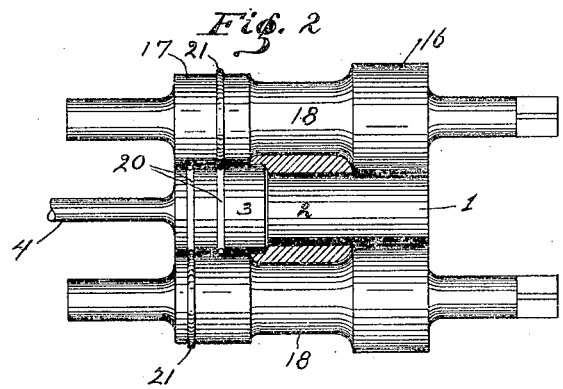
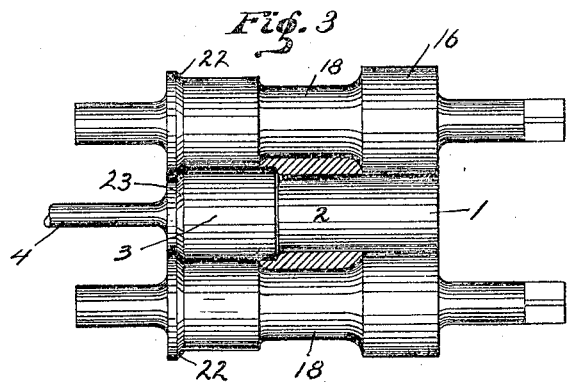

UNITED STATES PATENT OFFICE.

DAVID HEGGIE, OF McKEESPORT, PENNSYLVANIA, ASSIGNOR TO NATIONAL TUBE COMPANY, OF PITTSBURG, PENNSYLVANIA, A CORPORATION OF NEW JERSEY.

SOCKET-WELDING APPARATUS.

No. 808,657.　　　Specification of Letters Patent.　　　Patented Jan. 2, 1906.

Application filed March 23, 1903. Serial No. 149,108.

*To all whom it may concern:*

Be it known that I, DAVID HEGGIE, a resident of McKeesport, in the county of Allegheny and State of Pennsylvania, have invented a new and useful Improvement in Socket-Welding Apparatus; and I do hereby declare the following to be a full, clear, and exact description thereof.

My invention relates to apparatus for manufacturing pipe sockets or couplings and similar ring-shaped metal articles, its object being to provide apparatus whereby in the welding of the coupling it is formed with a countersunk recess on its inner face at one end, so as to dispense with the usual counterboring at one end thereof.

In the manufacture of pipe couplings or sockets a plate or bar of the necessary length, width, and thickness for the desired coupling is bent into ring form, the ends welded together, and the blank properly shaped. They are then threaded internally, after which the threads at both ends are removed for a short distance by counterboring, so as to form enlarged portions which permit the coupling to be screwed onto the pipes to such a distance as to cover the threads on the pipe where they run out. This counterboring is usually done only on one end of the coupling at a time, thus necessitating the clamping of the coupling in the chuck twice to counterbore both ends. The time and labor consumed in doing this adds materially to the cost of the couplings.

The object of my invention is to provide welding and shaping apparatus for making couplings or sockets which will form the same with a countersunk recess on its inner face at one end, so as to dispense with the counterboring at that end of the coupling and save practically one-half the time of counterboring. Furthermore, this countersunk recess diminishes the distance through which the tap must cut in threading the coupling, so that a considerable saving in time in threading also results.

To the accomplishment of the above object the invention consists in coupling welding and shaping apparatus comprising a cluster of welding-rolls with a centrally-arranged mandrel provided with coöperating annular shoulders to prevent endwise movement of the mandrel, said mandrel having a portion corresponding in diameter and contour to the interior of the coupling and having at one end a portion of enlarged diameter, which during the welding and shaping of the coupling will form a countersunk recess on the inner face of the coupling at one end thereof.

Figure 4:
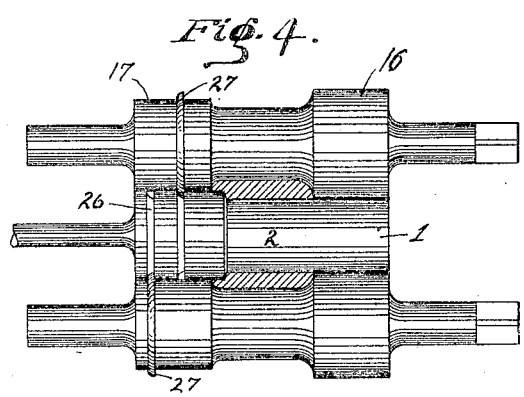
Figure 5:
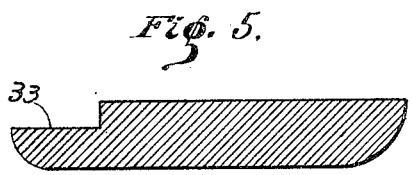

In the accompanying drawings, Figure 1 is a cross-section through welding-rolls suitable for carrying out my invention. Fig. 2 is a longitudinal section showing the shape of the rolls and the mandrel and one manner of preventing longitudinal movement of the mandrel. Figs. 3 and 4 are similar views showing modifications of the means for preventing endwise movement of the mandrel, and Fig. 5 is a cross-section through the bar from which the coupling is made.

The essential element of the apparatus comprises the mandrel 1, having a working portion 2 corresponding in diameter and shape to the interior of the coupling and having at one end of the working portion a portion 3, of enlarged diameter, which will form the countersunk recess in the coupling. This mandrel will be provided with the usual handle 4 for manipulating the same. I prefer to use a cluster of welding and shaping rolls surrounding said mandrel and have so illustrated the invention. This cluster of rolls preferably comprises five rolls mounted in suitable housings 5. Three of said rolls—such as the rolls 6, 7, and 8—are mounted directly in said housing and during the welding operation are held stationary, the roll 7 being mounted in fixed bearings while the rolls 6 and 8 are mounted in adjustable bearings 9 and 10, so that they can be brought to the proper position relative to the other rolls in the cluster. Below these three rolls is the sliding bearing 12, which has mounted in its upper end the rolls 13 and 14, so forming the five rolls of the cluster. Fitting within this cluster of rolls is the mandrel 1, which is inserted in the cluster before the blank is fed to the rolls and is withdrawn by hand after the welding operation.

The several rolls of the cluster have end flanges 16 and 17 adapted to bear upon the mandrel and confine the blank. The flanges 16 are of greater diameter than the flanges 17 and bear upon the smaller portion 2 of the mandrel, while the flanges 17 bear upon the enlarged portion 3 of said mandrel. Between these flanges are the working faces 18 of the rolls, which will correspond in width and shape to the finished coupling to be produced. The mandrel will be positioned in the rolls so that the enlarged portion 3 will project beyond the flanges 17 into the pass of the rolls, so that the coupling will be given the proper countersunk recess.

During the welding operation the mandrel must be held against endwise movement. Various means for this purpose may be employed. Preferably these means will comprise an annular shoulder on the mandrel, together with endwise-immovable means against which said shoulder bears, such endwise-immovable means preferably being coöperating shoulders on the rolls. In the drawings I have shown various means for accomplishing this purpose. In Fig. 2 the mandrel is provided with two annular grooves 20, and each of the rolls is provided with an annular rib 21, the grooves in the mandrel and the ribs on the rolls being semicircular. Two grooves in the mandrel are generally necessary because of the relation of the rolls of the cluster to each other, which in some machines are so close together that the ribs of two adjacent rolls if placed in the same vertical plane would interfere. Consequently the ribs on adjacent rolls must be in different vertical planes, and this necessitates two grooves in the mandrel.

In the operation of the apparatus the pressure is in the direction of forcing the mandrel endwise out of the rolls. Consequently the shoulder on the mandrel which receives the pressure will face outwardly, while those on the rolls will face inwardly, this being shown in Fig. 3, in which the rolls are provided with the inwardly-facing shoulders 22 and the mandrel with an outwardly-facing shoulder 23. This principle is also employed in the modification shown in Fig. 4, which differs from that shown in Fig. 2 only in the shape of the grooves in the mandrel and the ribs on the rolls. In Fig. 4 the grooves 26 in the mandrel have practically square outwardly-facing walls, while the ribs 27 on the rolls have practically square inwardly-facing walls, these coöperating square walls bearing against each other and insuring the mandrel against endwise movement even though the pressure be very heavy.

In the use of the apparatus the blank from which the coupling is made will preferably be a section of bar such as shown in Fig. 5—that is, provided on one edge face with a rabbet 33—so that in the welding of the coupling the metal will not have to be displaced to form the internal recess, thus diminishing the strain on the rolls and mandrel. This, however, is not necessary, as an ordinary flat blank will suffice. The blank, whether of the usual kind or such as shown in Fig. 5, after being properly heated is fed into the rolls in the usual way and will be coiled by the same about the mandrel and simultaneously shaped and welded. During this operation the mandrel will be held against endwise movement by any of the several means above described and will be in such position that the enlarged cylindrical portion 3 projects into the pass of the rolls beyond the flanges 17 a distance corresponding to the depth to which the countersunk recess is to be formed. Consequently in the welding and shaping of the blank it will be formed with this countersunk recess. After being welded the coupling will be taken to the tapping-machine and threaded internally. The countersink or recess in one end of the coupling reduces the distance through which the tap must cut and as a consequence reduces the time necessary in threading the coupling. Furthermore, the end which is provided with the countersink or recess need not be counterbored, so that practically only one-half of the time now employed for counterboring is necessary. The saving in the time of tapping and counterboring materially decreases the cost of the finished coupling.

What I claim as my invention, and desire to secure by Letters Patent, is—

1. In apparatus for welding and shaping pipe-couplings or similar articles, the combination of a central mandrel and a cluster of rolls surrounding the same, said rolls having flanges at each end adapted to contact with the mandrel and confine the blank, said mandrel corresponding in diameter to the interior of the article to be formed and having a portion of enlarged diameter at one end projecting into the pass of the rolls, and coöperating annular shoulders on the mandrel and rolls to prevent endwise movement of the mandrel during the welding and shaping operation.

2. In apparatus for welding and shaping pipe-couplings or similar articles, the combination of a central mandrel and a cluster of rolls surrounding the same, said rolls having flanges at each end adapted to contact with the mandrel and confine the blank, said mandrel corresponding in diameter to the interior of the article to be formed and having a portion of enlarged diameter at one end projecting into the pass of the rolls, and coöperating annular grooves and ribs on the mandrel and rolls for preventing endwise movement of the mandrel during the welding and shaping operation.

3. In apparatus for welding and shaping pipe-couplings or similar articles, the combination of a central mandrel and a cluster of rolls surrounding the same, said rolls having flanges at each end adapted to contact with the mandrel and confine the blank, said mandrel corresponding in diameter to the interior of the article to be formed and having a portion of enlarged diameter at one end projecting into the pass of the rolls, square inwardly-facing shoulders on the rolls, and a square outwardly-facing shoulder on the mandrel contacting with the shoulders on the rolls and adapted to prevent endwise movement of the mandrel during the welding and shaping operation.

4. In apparatus for welding and shaping pipe-couplings or similar articles, the combination of a central mandrel, and a cluster of rolls surrounding the same, said rolls having flanges at each end adapted to contact with the mandrel and confine the blank, said mandrel corresponding in diameter to the interior of the article to be formed and having a portion of enlarged diameter at one end projecting into the pass of the rolls, a plurality of annular grooves formed in the mandrel, and a single annular bead formed on each of the rolls and adapted to coöperate with the grooves in the mandrel to prevent endwise movement thereof.

In testimony whereof I, the said DAVID HEGGIE, have hereunto set my hand.

DAVID HEGGIE.

Witnesses:
J. A. CAUGHEY,
E. P. COREY.